US 11,781,306 B2

(12) United States Patent
Montestruque et al.

(10) Patent No.: US 11,781,306 B2
(45) Date of Patent: Oct. 10, 2023

(54) SYSTEMS AND METHODS USING PROBABILISTIC FORECAST FOR AGENT-BASED CONTROL OF SEWERS

(71) Applicant: EmNet, LLC, South Bend, IN (US)

(72) Inventors: Luis Montestruque, South Bend, IN (US); Ruben Kertesz, South Bend, IN (US); Frederic Myers, South Bend, IN (US)

(73) Assignee: XYLEM VUE INC., New York, NY (US)

( * ) Notice: Subject to any disclaimer, the term of this patent is extended or adjusted under 35 U.S.C. 154(b) by 819 days.

(21) Appl. No.: 16/754,762

(22) PCT Filed: Nov. 14, 2018

(86) PCT No.: PCT/US2018/060866
§ 371 (c)(1),
(2) Date: Apr. 9, 2020

(87) PCT Pub. No.: WO2019/099419
PCT Pub. Date: May 23, 2019

(65) Prior Publication Data
US 2020/0270856 A1    Aug. 27, 2020

Related U.S. Application Data

(60) Provisional application No. 62/585,545, filed on Nov. 14, 2017.

(51) Int. Cl.
*G06F 11/30* (2006.01)
*E03F 3/02* (2006.01)
(Continued)

(52) U.S. Cl.
CPC ............... *E03F 3/02* (2013.01); *E03F 1/00* (2013.01); *G01F 1/00* (2013.01); *G05D 7/0617* (2013.01); *G06F 17/18* (2013.01); *E03F 2201/20* (2013.01)

(58) Field of Classification Search
CPC .................... E03F 3/02; G05D 7/0617
See application file for complete search history.

(56) References Cited

U.S. PATENT DOCUMENTS

2002/0173923 A1* 11/2002 Schutzbach ............. G01F 1/002
702/45
2004/0154965 A1    8/2004 Baum et al.
(Continued)

FOREIGN PATENT DOCUMENTS

| JP | 2003138641 A | 5/2003 |
|---|---|---|
| JP | 3943370 B2 | 7/2007 |
| KR | 10-2014-0029155 A | 3/2014 |

OTHER PUBLICATIONS

International Search Report and Written Opinion of International Application No. PCT/US2018/060866 dated Mar. 7, 2019, 8 pages.
(Continued)

*Primary Examiner* — Phuong Huynh
(74) *Attorney, Agent, or Firm* — EcoTech Law Group, P.C.

(57) ABSTRACT

Fluid stream management systems and methods relating thereto are described. The fluid management system includes: (1) one or more storage chambers; (2) two or more flow condition attribute measuring devices configured to measures certain flow condition attribute values; (3) one or more flow controllers that are communicatively coupled to receive the flow condition attribute values and use them to establish certain cost functions; and (4) one or more flow-modifying devices, each of which is coupled to at least one of the flow controllers, and based upon instruction received
(Continued)

from at least one of the flow controllers, the flow-modifying device is capable of modifying flow of fluid through one or more of the flow-modifying devices to minimize a difference between the established cost functions.

30 Claims, 8 Drawing Sheets

(51) Int. Cl.
*E03F 1/00* (2006.01)
*G05D 7/06* (2006.01)
*G01F 1/00* (2022.01)
*G06F 17/18* (2006.01)

(56) References Cited

U.S. PATENT DOCUMENTS

| | | | |
|---|---|---|---|
| 2014/0178211 A1* | 6/2014 | Nybo | F04D 15/0218 |
| | | | 417/212 |
| 2015/0227142 A1* | 8/2015 | Hutchings | G05B 15/02 |
| | | | 700/282 |
| 2015/0240471 A1 | 8/2015 | Pank | |

OTHER PUBLICATIONS

Extended European Search Report received for European Application No. 18878164.5, dated Aug. 11, 2021, 3 pages.
First Examination Report received for Indian Application No. 202017015218, dated Nov. 2, 2021, 7 Pages.

* cited by examiner

60 ⟶

| Outcomes | Low Quality Treatment Enabled | Low Quality Treatment Disabled |
|---|---|---|
| No Overflow | False Positive (bad) | Desirable |
| Overflow | Desirable | False Negative (bad) |

Pr(precip>X)

T = T+0 hours

Precip = 0

Pr(precip>X)

T = T+1 hours

Precip = a

Pr(precip>X)

T = T+2 hours

Precip = b

Y
Pr(precip>X)

T = T+3 hours

Precip = c

SYSTEMS AND METHODS USING PROBABILISTIC FORECAST FOR AGENT-BASED CONTROL OF SEWERS

RELATED APPLICATION

The application claims priority from U.S. Provisional Application having Ser. No. 62/585,545 filed on Nov. 14, 2017, which is incorporated herein by reference for all purposes.

FIELD

The present teachings generally relate to systems and methods relate to novel sewer systems. More particularly, the present teachings relate to novel systems and methods that use probabilistic forecast for agent-based control of sewer systems.

BACKGROUND

A sewer system collects, transports, treats and/or dispenses fluid. To accomplish this, the sewer system may include a network of interconnected trunk lines or pipes for directing fluid flow within the sewer system. Additionally, sewer systems may include various components to treat and/or store the fluid. Managing complicated arrangements of these components poses unique challenges that remain unsolved. This problem is exacerbated when weather forecasts bring unpredictability to the loads placed on the sewer systems.

What are, therefore, needed are novel systems and methods that are employed for effective sewage management.

SUMMARY

To achieve the foregoing, the present teachings provide novel systems and methods using probabilistic forecast for agent-based control of sewer systems. Although probabilistic forecasts may inform on a variety of matters, in one preferred embodiment, systems and methods of the present teachings use probabilistic weather forecasts for agent-based control.

In one aspect, the present arrangements provide sewer systems. One exemplar of such a sewer system includes: (1) one or more storage chambers; (2) two or more flow condition attribute measuring devices, at least one of which is arranged to measure a flow condition attribute value of fluid stored inside one of the storage chambers and at least another of which is arranged to measure a flow condition attribute value of fluid flowing inside the sewer system; (3) one or more flow controllers that are communicatively coupled to receive the flow condition attribute values from two or more of the flow condition attribute measuring devices, and wherein one of the flow controllers, based upon the flow condition attribute value of fluid stored inside one of the storage chambers, establishes a cost function of realizing one or more potential outcomes of the sewer system, and wherein based upon the flow condition attribute value of flow inside the sewer system, one and/or another of the flow controllers establishes a cost function of flow inside the sewer system; and (4) one or more flow-modifying devices, each of which is coupled to at least one flow controllers and based upon instruction from at least one of the flow controllers, the flow-modifying device is capable of modifying flow of fluid through one or more of the flow-modifying devices to minimize a difference between the cost function of realizing one or more potential outcomes of the sewer system and the cost function of flow inside the sewer system.

In embodiment, one or more of the flow controllers of the present arrangements are programmed to provide instructions for modifying flow-rate of fluid exiting from the sewer system to enter a low-quality treatment scheme that is not part of the sewer system. The low-quality treatment scheme may be configured to provide partial treatment of fluid exiting from the sewer system. Partial treatment preferably excludes biological or contaminant treatment to maintain high flow-rates of fluid through a treatment scheme. In another embodiment, one or more of the flow controllers are programmed to provide instructions for modifying flow-rate of fluid exiting from the sewer system to enter a high-quality treatment scheme that is not part of the sewer system. In this embodiment, the high-quality treatment includes chemical, mechanical, and contaminant (including biological) treatment.

The sewer system of the present arrangements preferably includes at least one storage chamber. Certain of these embodiments, however, may additionally include at least one treatment chamber, but it is not necessary. The flow condition attribute measuring device used for measuring the flow condition attribute value of fluid stored inside one of the storage chambers may be of the same type as the flow condition attribute measuring device used for measuring the flow condition attribute of fluid flowing inside the sewer system. In preferred embodiments, the flow condition attribute measuring device used, in the present arrangements, for measuring the flow condition attribute value of fluid stored inside one of the storage chambers is of a different type than the flow condition attribute measuring device used for measuring the flow condition attribute value of fluid flowing inside the sewer system. By way of example, one of the flow condition attribute measuring devices is a level meter that is configured to measure a height, or a level value of fluid stored inside one of the storage chambers. As another example, one of the flow condition attribute measuring devices is a flow-rate meter that is configured to measure a flow-rate of fluid flowing inside the sewer system.

There are many types of controllers that will work well in the present arrangements. According to one embodiment, one or more the fluid flow controllers of the present arrangements is a proportional-integral-derivative controller that modifies a fluid pump rate of a pump that pumps fluid out of the sewer system and into a treatment scheme. Representative examples of the flow condition attribute include fluid flow-rate, fluid height, fluid volume, hydraulic capacity, time of fluid retention, storage capacity, and fluid quality. Moreover, at least one of the flow condition attribute values is at least one value of a flow condition attribute chosen from a group comprising fluid flow-rate, fluid height, fluid volume, hydraulic capacity, time of fluid retention, storage capacity, and fluid quality. Fluid may include sewage (e.g., solids).

One or more of the flow-modifying devices may include at least one member chosen from a group comprising fluid facility, fluid pump station, gate, inflatable dam, weir, pump and valve. One or more of the controllers, preferably, modify flow exiting from the sewer system to be introduced into one or more treat schemes, at least one of which is chosen from a group comprising storage tank, trunk line, fluid treatment plant, treatment chamber, holding pool, reservoir, ocean, and river. One or more flow controllers may be coupled to and operate in conjunction with a neural network.

In another aspect, the present teachings provide methods for managing a sewer system. One exemplar of such a method includes: (1) obtaining a probabilistic distribution forecast for a variable for each of multiple time intervals; (2) building for the variable, based upon the probabilistic distribution forecast, multiple time interval ensemble forecasts, each ensemble forecast for one of the multiple time intervals; (3) retrieving or developing a flow simulation to simulate flow of a fluid inside the sewer system; (4) initializing the flow simulation, by accounting for one or more flow condition attributes present inside the sewer system, to generate an initialized flow simulation; (5) running, based on an assumed value of one or more flow condition attributes present at a treatment scheme located outside the sewer system, the initialized flow simulation that uses each of the time interval ensemble forecasts to arrive at number of times one or more different potential outcomes are realized; (6) establishing, based on number of times one or more of the potential outcomes are realized, a cost function of realizing one or more potential outcomes of the sewer system; (7) establishing, based on one or more of the flow condition attributes in the sewer system, a cost function of flow inside the sewer system; and (8) controlling, using a flow controller, flow of the fluid exiting the sewer system to minimize a difference between the cost function of realizing one or more potential outcomes of the sewer system and the cost function of flow inside the sewer system. The above-mentioned obtaining in (1) may include obtaining from a weather service a rainfall probabilistic distribution forecast for a plurality of hours in the future.

In one embodiment of the present teachings, the above-mentioned "building" in (2) includes building a rainfall time interval ensemble forecast for multiple of the time intervals in series such that an average or median value of precipitation obtained from each of the time intervals substantially equals a value of the precipitation in corresponding ones of the time intervals of the rainfall probabilistic distribution forecast.

In one embodiment of the present teachings, the above-mentioned "initializing" in (4) includes using one or more primary flow condition attribute measuring devices, which measure one or more flow condition attributes inside the sewer system. The initializing in (4), preferably, includes using one or more measurements from a level meter, which measures a fluid level in a storage chamber inside the sewer systems, and also, preferably, includes one or more measurements from a flow-rate meter, which measures a flow-rate of a fluid exiting the sewer system and flowing into the treatment scheme.

"Running" as described in (5), above, is carried out based on a current value of one or more flow condition attributes present at the treatment scheme located outside the sewer system. Preferably, this running of initialized flow simulation includes using one or more measurements from a flow-rate meter, which measures flow-rate of a fluid that exits the sewer system and flows into the treatment scheme. By way of example, the treatment scheme includes a low-quality treatment scheme.

The above-mentioned "establishing" described in (6) may include establishing:

$$C_{storage} = Y/(X+Y).$$

In this equation, "Y" represents number of times one of the potential outcomes is realized and "X" represents number of times another of the potential outcomes is realized, wherein one of the potential outcomes is different from another of the potential outcomes. In an example where the sewer system includes one or more storage chambers for storing a fluid, the above-mentioned establishing described in (6) includes establishing the cost function of realizing one or more potential outcomes of the sewer system, and in the equation above, "Y" represents number of times one or more of the storage chambers overflows and "X" represents number of times one or more of the storage chambers does not overflow.

The above-mentioned "establishing" described in (7) may include establishing:

$$Cst = \frac{Qst(t)}{Qmax}(1 - \varepsilon) = \varepsilon.$$

In this equation, "Cst" represents the cost of flow inside the sewer system, "Qst(t)" represents a current flow condition attribute value associated with the treatment scheme located outside the sewer system, "Qmax" represents a maximum flow condition attribute value associated with the treatment scheme and "$\varepsilon$" represents a minimum cost associated with the treatment scheme. The treatment scheme may include a low-quality treatment chamber for treating a fluid conveyed from the sewer system. In this scheme, "Qst(t)" specifically represents a current flow-rate through the high-rate treatment chamber, "Qmax" specifically represents a maximum flow-rate through the high-rate treatment chamber, and "$\varepsilon$" specifically represents the minimum cost associated with the high-rate treatment chamber.

In the above-mentioned "controlling" described in (8), controlling, preferably, includes using a proportional, integral, derivative controller. In one exemplar implementation of "controlling," the controller controls operation of the flow-modifying device such that the flow-modifying device increases or decreases a flow-rate of the fluid exiting the sewer system and flowing into the treatment scheme. A specific implementation of "controlling" includes modifying, using a pump that receives instructions from the controller, a pumping rate of the fluid exiting the pump from the sewer system to the treatment scheme located outside the sewer system, and wherein the fluid includes sewage. Preferably, the controlling includes increasing, prior to arrival of a storm, flow-rate of the fluid exiting the sewer system and flowing into the treatment scheme.

The system and method of operation of the present teachings and arrangements, however, together with additional objects and advantages thereof, will be best understood from the following descriptions of specific embodiments when read in connection with the accompanying figures.

BRIEF DESCRIPTION OF THE DRAWINGS

FIG. 3 shows a table of different types of outcomes realized by the sewer management facilities shown in FIGS. 1 and 2, when low-quality treatment is enabled or disabled to treat the contents.

FIGS. 7A-7D show a time series of probabilistic forecasts in graphical form, according to one embodiment of the present teachings, for different time intervals, and each graph shows the probability of amount of precipitation greater than X (i.e., amount of precipitation) versus X (i.e., amount of precipitation) for a particular time interval chosen from the different time intervals.

DETAILED DESCRIPTION OF THE DRAWINGS

In the following description, numerous specific details are set forth in order to provide a thorough understanding of the present teachings and arrangements. It will be apparent, however, to one skilled in the art that the present teachings and arrangements may be practiced without limitation to some or all of these specific details. By way of example, certain preferred embodiments are described in terms of treatment of "sewage," but the present teachings recognize that these preferred embodiments may equally apply to treatment of a "fluid" and are not limited to "sewage." In other instances, well-known process steps have not been described in detail in order to not unnecessarily obscure the present teachings and arrangements.

Figure 1:
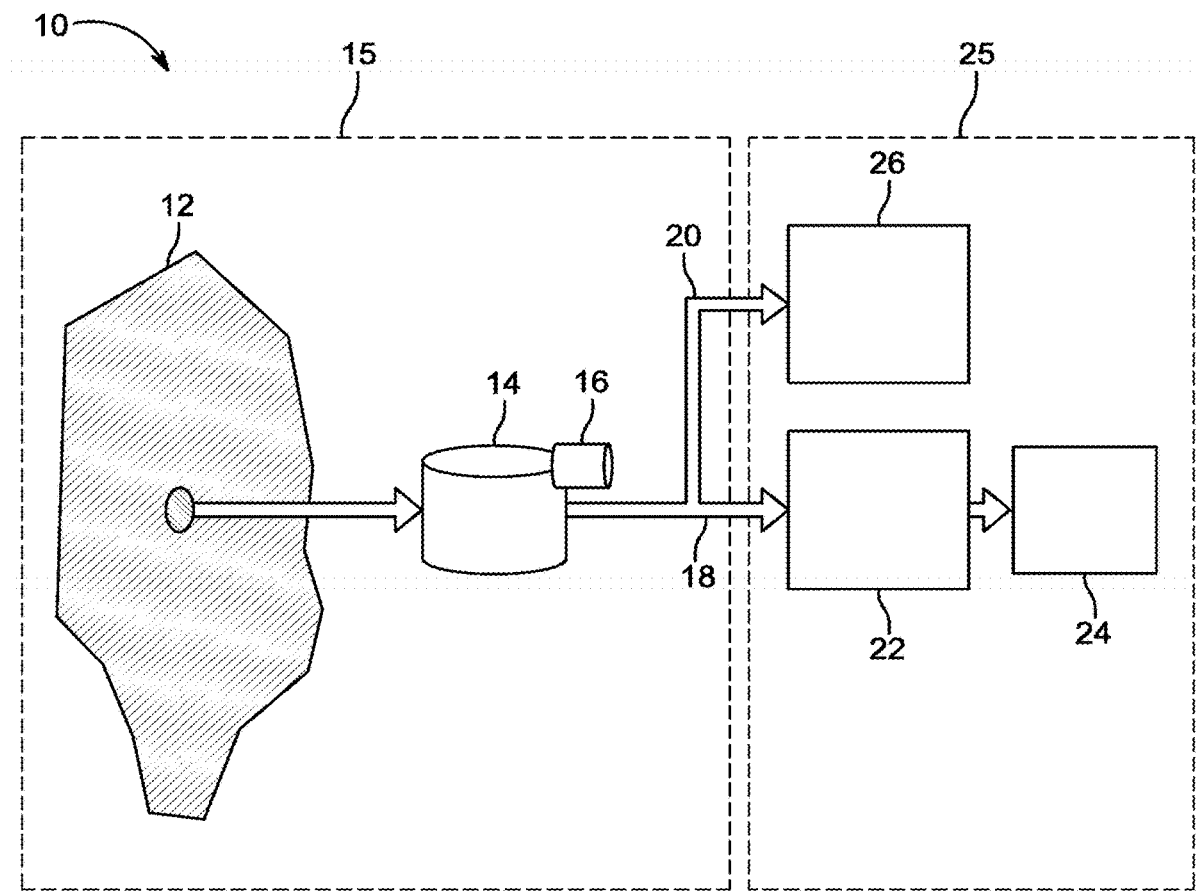
FIG. 1 shows a schematic of a sewer management facility, according to one embodiment of the present arrangements and that is coupled to a sewage treatment scheme that provides both low-quality treatment and high-quality treatment, which includes a secondary chamber.

Sewer systems and their associated methods of management described herein use probabilistic forecasts. FIG. 1 shows a sewer management facility 10, according to one embodiment of the present arrangements and that includes a sewer system 15 that is coupled to a treatment scheme 25. Sewer system 15 includes a catchment area 12 and a storage chamber 14 fitted with an outlet 16 to discharge overflow of contents inside storage chamber. Treatment scheme 25 provides high-quality treatment and low-quality treatment.

In low-quality treatment, the fluid is partially treated to produce water. Not in all embodiments, but typically low-quality treatment of the present teachings does not rely upon biological treatment, which may be time consuming. Rather, low-quality treatment implements mechanical and chemical treatment, which allow for high throughput of fluid treatment. In contrast, high-quality treatment is one that provides "full" treatment of water where all contaminants, including bacteria, are reduced below limits established by the Environmental Protection Agency. As such, high-quality treatment incorporates mechanical, chemical and biological treatment of sewage to produce water.

Contents inside storage chamber 14 are conveyed through a high-quality treatment line 18 for high-quality treatment that is carried out using a primary chamber 22 and a secondary chamber 24. Typically, primary chamber 22 has a higher flow rate capacity of treatment than secondary chamber 24. In high-quality treatment, contents of storage chamber 14, preferably, initially undergo solids removal and are subsequently treated for bacteria and nutrient compositions. Once the flow rate capacity of high-quality treatment reaches its maximum capacity, then through low-quality treatment line 20, contents of storage chamber 14 are preferably conveyed to low-quality treatment chamber 26. Primary chamber 22 is, preferably, configured to implement mechanical and chemical treatment and secondary chamber is preferably configured to implement contaminant removal. In certain embodiments, primary chamber of the present arrangements, however, also implements contaminant removal and as a result, a secondary chamber is not necessary.

Figure 2:
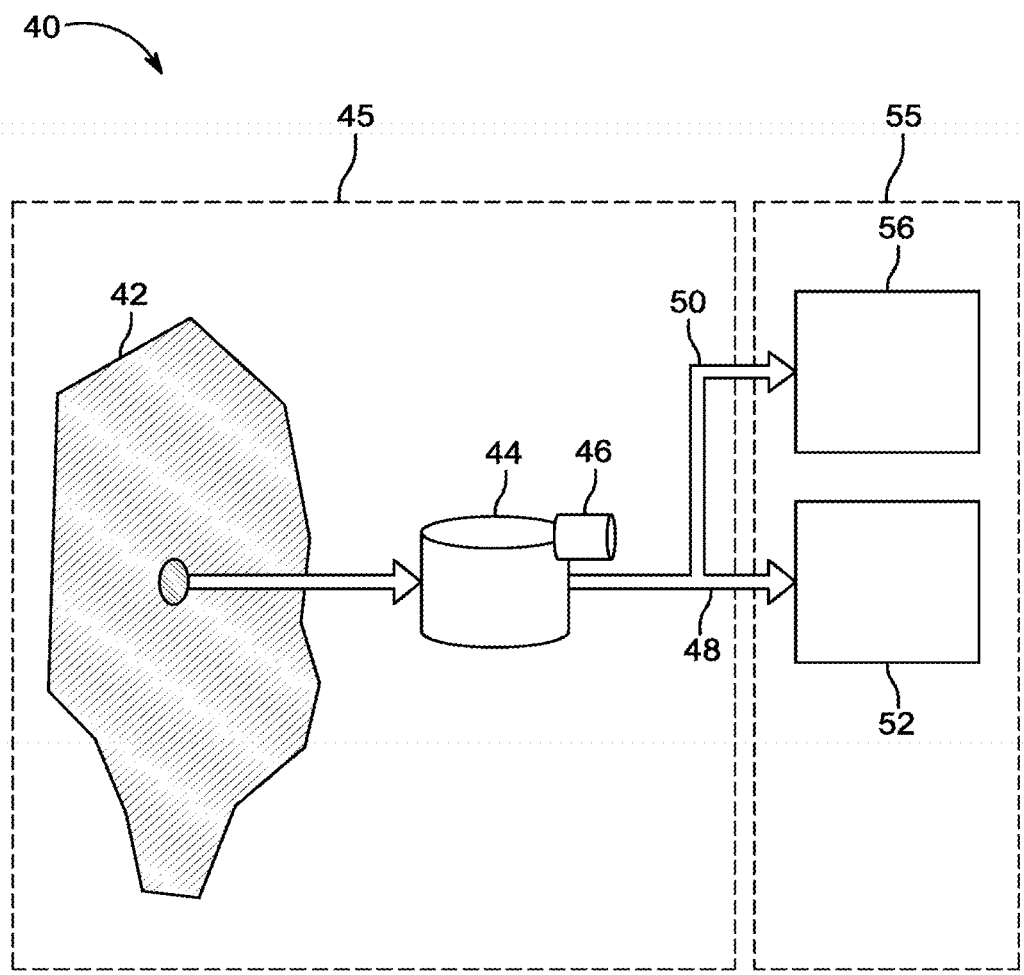
FIG. 2 shows another schematic of a sewer management facility, according to another embodiment of the present arrangements and that is coupled to a treatment scheme that provides both low quality treatment and high-quality treatment.

FIG. 2 shows a sewer management facility 40, according to one embodiment of the present arrangements and that is substantially similar to sewer management facility 10 shown in FIG. 1, except treatment scheme 55 of FIG. 2 does not include a secondary chamber (like secondary chamber 24 of FIG. 1) for high-quality treatment. In other words, sewer system 45 of FIG. 2 that includes a catchment 42, a storage chamber 44, an outlet 46, a high-quality treatment line 48, a low-quality treatment line 50 are substantially similar to their counterparts described in connection with sewer system 15 of FIG. 1, i.e., catchment 12, a storage chamber 14, an outlet 16, a high-quality treatment line 18, a low-quality treatment line 20. Further, in the absence of a secondary chamber, primary chamber 52 may be substantially similar to primary chamber 22 of FIG. 1, except that primary chamber 52 may have a higher flow rate capacity of treatment than primary chamber 22. Further, once the flow rate capacity of high-quality treatment in primary chamber 52 reaches its maximum capacity, then through low-quality line 50, contents of storage chamber 44 are preferably conveyed to low-quality treatment chamber 56.

In an exemplar of FIG. 2, catchment area is about 1 square mile, storage chamber 44 has a capacity of about 500,000 gallons, flow rate capacity of primary chamber 52 is a value that ranges from about 0 gallons per day to about 30 million gallons per day and that of secondary chamber is a value that ranges from about 0 gallons per day to about 50 million gallons per day.

The present teachings recognize that before a storm arrives, low-quality treatment plays an integral role in the treatment of sewer. Although a low-quality treatment chamber (e.g., chamber 26 of FIG. 1 and chamber 56 of FIG. 2) produces relatively low quality of treated sewer, it preferably does so at high flow rates. As a result, in the event of a storm, a treatment scheme, that relies on high flow rates of sewer treatment such as those realized when low-quality treatment is enabled, reduces the chances of overflow from an outlet of storage chamber (e.g., outlet 16 of storage chamber 14 of FIG. 1 and outlet 46 of storage chamber 44 of FIG. 2). Particularly if the storm event is deemed a large one, then the present teachings recognize the merit of enabling low-quality treatment well in advance of the storm's arrival. For a "large" storm event, if the low-quality treatment is not enabled, then the present teachings recognize that the undesired outcome of "overflow" is realized. Further, if the storm event is deemed a "small" event, then it is unnecessary to expend the energy to enable and keep active low-quality treatment and, from one perspective, even more undesirable than that—discharge low-quality fluid into the environment. The present teachings recognize that for a "small" storm event, not enabling low-quality treatment not only avoids expending unnecessary energy, but also prevents the undesired outcome of "overflow." A "large storm event"

may be more than or equal to 1 inch of rainfall in an hour, and a "small storm event" may be less than or equal to 0.01 inches of rainfall in an hour.

The present teachings also recognize that overflow of untreated sewage is the most undesirable outcome and relative to the outcome of sewage overflow, low quality-treatment of sewage is a desirable outcome. Against this backdrop, it is important to analyze the desirability of these outcomes of "overflow of untreated sewage" or "no overflow of untreated sewage" in light of the amount of energy expended to avoid overflow. In certain circumstances, "overflow of untreated sewage" is an acceptable outcome when the energy enable low quality treatment is not being wasted. Thus, the present teachings recognize that, prior to arrival of a storm, a decision whether low-quality treatment is enabled should be made and this decision may be predicated on the size of the storm.

To this end, FIG. 3 shows a table that presents possible outcomes, i.e., "No Overflow" and "Overflow," for both situations when "Low Quality Treatment [Is] Enabled" or when "Low Quality Treatment [Is] Disabled." If confronted with a "small storm" forecast, "Low Quality Treatment [Is] Enabled," and there is "No Overflow" (e.g., sewage from outlet 16 of storage chamber 14 of FIG. 1 does not overflow or sewage from outlet 46 of storage chamber 44 of FIG. 2 does not overflow), then "No Overflow" is an undesirable outcome because unnecessary energy is expended to enable low quality treatment (when it is not required because the storm was not large enough in the first place to produce an overflow). In this case, the undesirable outcome of "No Overflow" is referred to as a "False Positive" because it is not necessary to enable low quality treatment under this situation of a "small" storm event. In the same enabled setting of low-quality treatment, if confronted with a "large" storm event, instead of a "small" storm event, and the outcome is "Overflow," then that outcome is deemed a desirable one because the energy to enable and run low-quality treatment is necessary to treat the "large" storm event and is therefore not wasted.

If "Low Quality Treatment [Is] Disabled," and there is "No Overflow," then that is a desirable outcome because there is no need to expend energy to enable low quality treatment when it is not required. If "Low Quality Treatment [Is] Disabled," and there is "Overflow" (e.g., sewage from outlet 16 of storage chamber 14 of FIG. 1 overflows or sewage from outlet 46 of storage chamber 44 of FIG. 2 overflows), then that is an undesirable outcome because energy should have been expended to enable low quality treatment and avoid the "Overflow" outcome. In this case, the undesirable outcome of "Overflow" is referred to as a "False Negative" because disabling low quality treatment under this situation did not provide a desirable outcome.

Building on these types of outcomes and taking into account their underlying energy requirements, the present invention recognizes, in some instances, the need to enable low quality treatment, or high flow rate treatment, well in advance of a storm's arrival. When operating under this scenario, among the many considerations, one consideration inquires into a period of time prior to a storm's arrival, should low quality treatment, or high flow rate treatment, be enabled. According to the present teachings, a decision to enable low-quality treatment, prior to arrival of a storm, may depend on the forecast of the size of the storm. In other words, if the forecast is of a relatively large storm, then the low-quality treatment may be enabled relatively early compared to a situation where the forecast is for a relatively smaller-sized storm.

Figure 4:
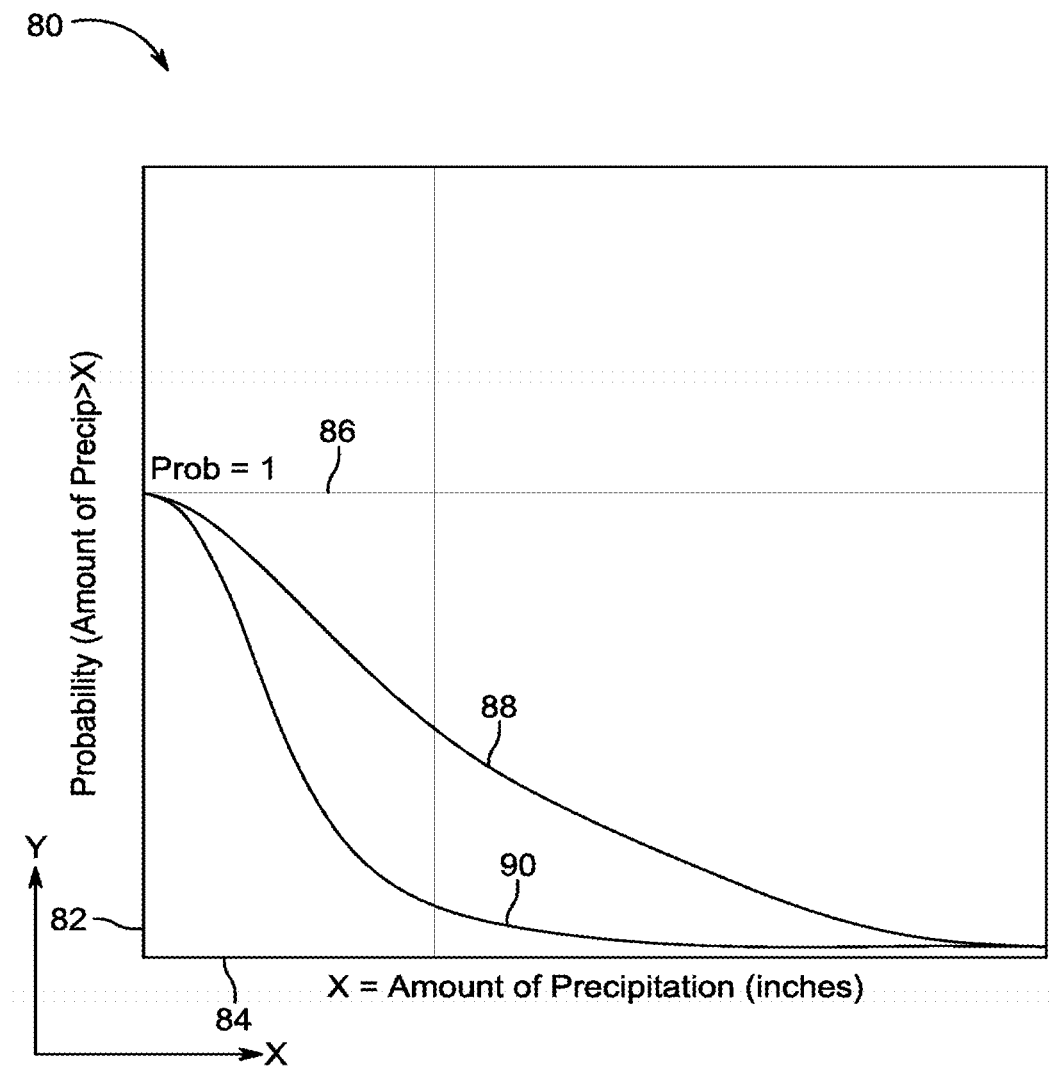
FIG. 4 shows a probabilistic forecast, i.e., graph of probability of amount of precipitation greater than X (i.e., amount of precipitation) versus X (i.e., amount of precipitation) for large rainfall event and a small rainfall event.

FIG. 4 shows a graphical representation of probabilistic forecasts 80, according to one embodiment of the present teachings. This representation shows values of a probability function of amount of precipitation greater than X (i.e., amount of precipitation) plotted along a Y-axis and values of X (i.e., amount of precipitation in inches) plotted along an X-axis (which is perpendicular to the Y-axis). Probabilistic forecasts 80 shows a large rainfall curve 88 and a small rainfall curve 90 relative to a horizontal line that represents a condition when the probability function equals 1 (one). As will be explained later, probabilistic forecasts provide insight into strength of a potential storm that will impact the capacity of a sewer management facility and accordingly, allows for effective management of sewage treatment.

Figure 5:
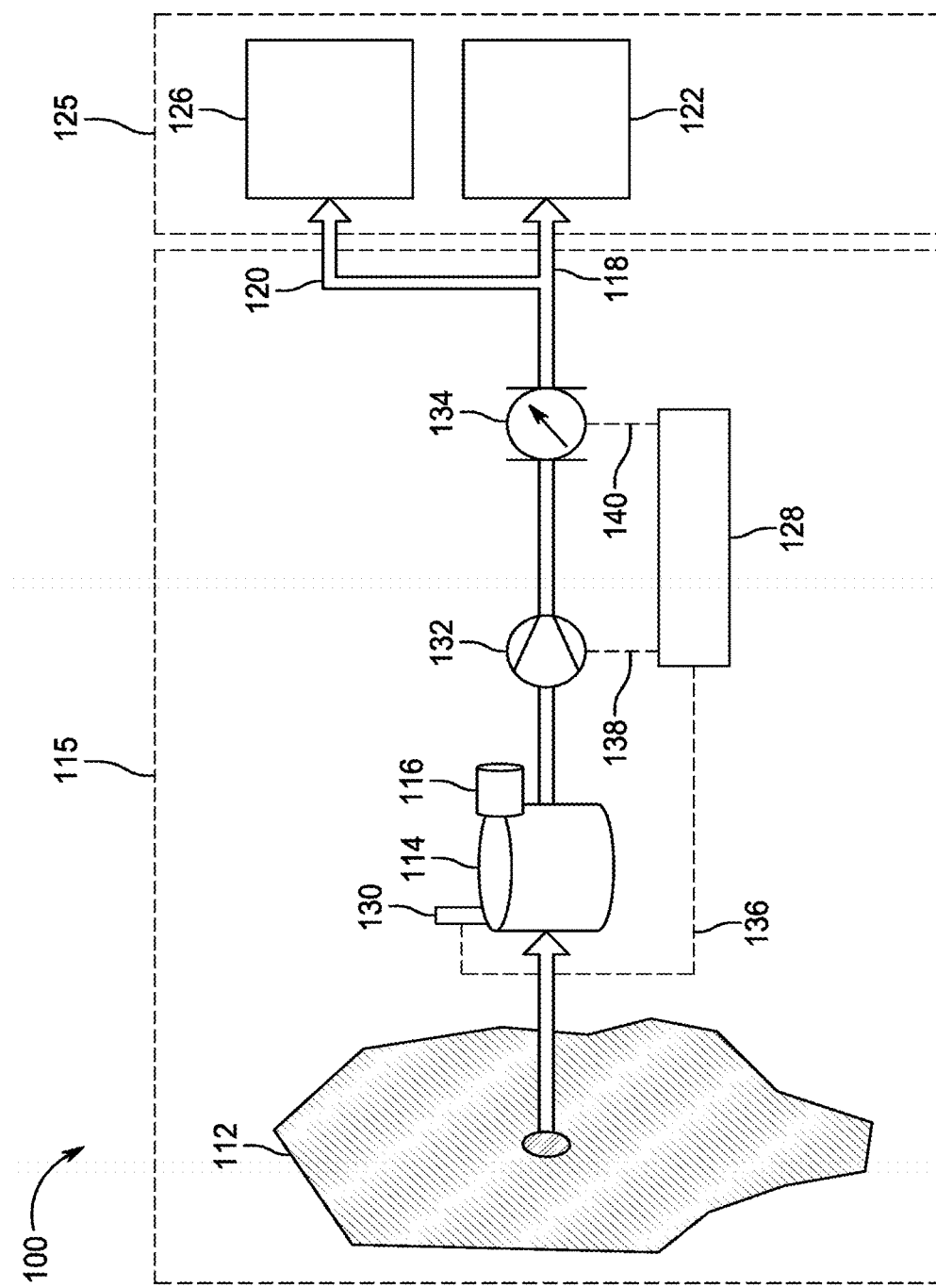
FIG. 5 shows a schematic of a sewer system, according to a preferred embodiment of the present arrangements and that effectively manages sewage treatment by using one or more probabilistic forecasts such as the one shown in FIG. 4.

FIG. 5 shows a sewer management facility 100, according to one embodiment of the present arrangements. Sewer management facility 100 has certain components, i.e., catchment area 112, a storage chamber 114, an outlet 116, a high quality treatment line 118, and a low quality treatment line 120, that are substantially similar to their counterparts found in sewer management facility 45 of FIG. 2, i.e., catchment area 12, a storage chamber 14, an outlet 16, a high quality treatment line 18, and a low quality treatment line 20. Sewer management facility 100 further includes a level meter 130, a flow-modifying device 132, and a flow rate meter 134, each of which is communicatively coupled to a flow controller 128. In the configuration of FIG. 5, flow controller receives information regarding level or height of sewage or fluid stored inside storage chamber 114 from level meter 130 and receives information regarding flow rate of sewage flowing (through flow rate meter 134) from flow rate meter 134. Measurement of flow rate from flow rate meter 134 also indicates the flow rate of sewage exiting from a sewer system 115 to a treatment scheme 125.

In one embodiment, treatment scheme 125 of the present arrangements is substantially similar to treatment scheme 25 of FIG. 1. In another embodiment, treatment scheme 125 of the present arrangements is substantially similar to treatment scheme 55 of FIG. 2. In other words, each of high-quality treatment chamber 122 and low-quality treatment chamber 126 of FIG. 5 are substantially similar to their counterparts of FIG. 2, i.e., high-quality treatment chamber 52 and low-quality treatment chamber 56 of FIG. 2, respectively.

Although FIG. 5 shows a single storage chamber, single ones of—storage chamber 114, level meter 130, flow-modifying device 132, flow rate meter 134, flow controller 128 and treatment scheme 125 or components therein, the present arrangement are not so limited. Certain embodiments of the present arrangements include more than of—storage chamber 114, level meter 130, flow-modifying device 132, flow rate meter 134, flow controller 128 and treatment scheme 125 or components therein (e.g., primary chamber 122 and/or secondary chamber 126).

Figure 6:
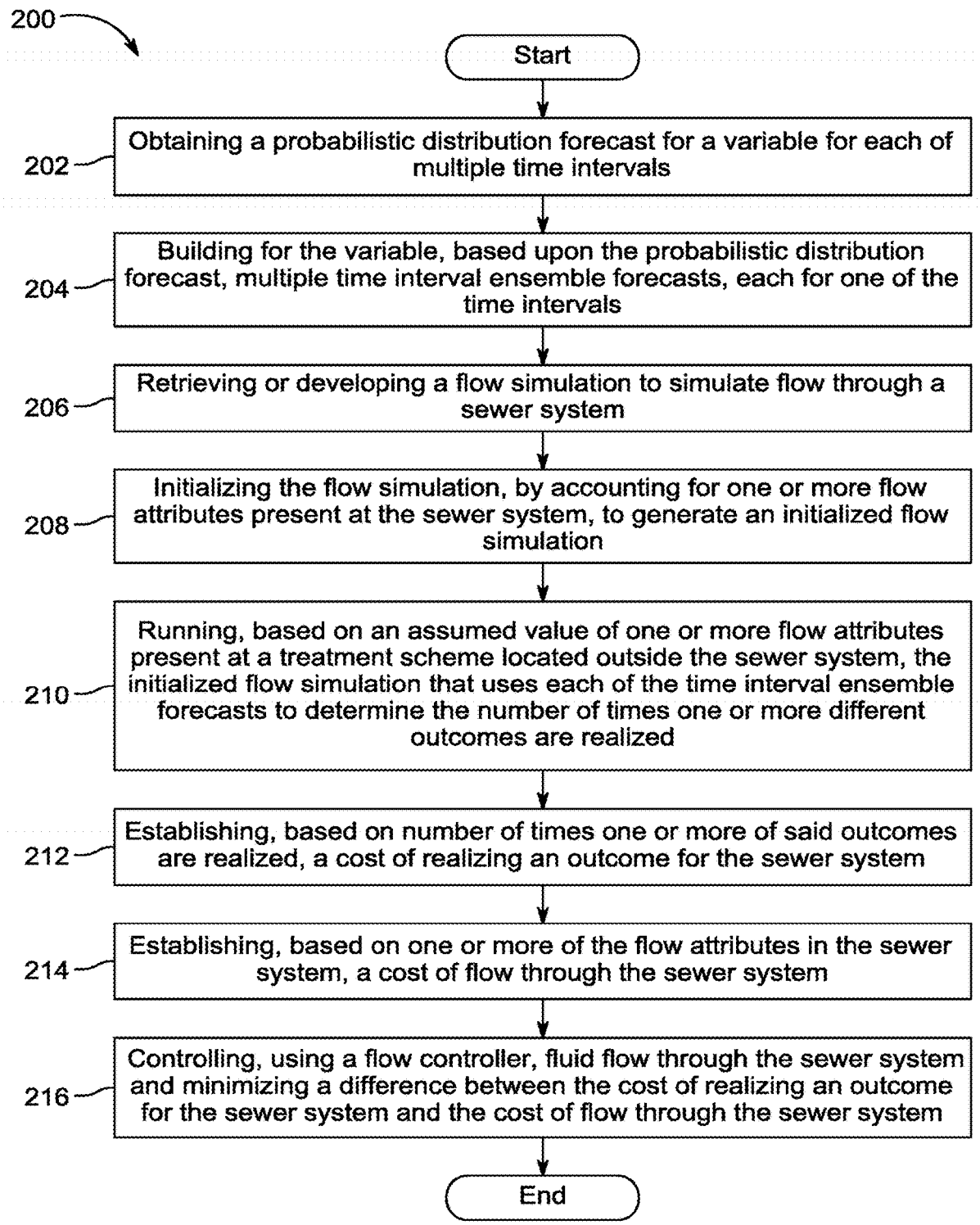
FIG. 6 shows a flow chart for a sewer management method, according to one embodiment of the present invention and that preferably continuously uses one or more probabilistic forecasts such as the one shown in FIG. 4.

FIG. 6 shows a flow chart for a sewage management method 200, according to one embodiment of the present teachings. To conform to the present teachings, sewer management method 200 need not be implemented using any specific system or structure. However, implementing this method using sewer system 100 of FIG. 5 represents a preferred embodiment of the present teachings.

Sewer management method 200 preferably begins with a step 202 that involves obtaining a probabilistic distribution forecast for a variable for each of multiple time intervals. In one preferred embodiment, step 202 of the present teachings include obtaining from National Oceanic and Atmospheric Administration ("NOAA"). By way of example, each of FIGS. 7A-7D show a graphical representation of a probabilistic distribution forecast of precipitation or, in the alternate, rainfall, for a particular time interval that may be received from NOAA. In this example, FIG. 7A specifically shows a probabilistic distribution forecast of precipitation for T=0 hours, i.e., at the time of the forecast, FIGS. 7B-7D, similarly, show the probabilistic distribution forecast of precipitation at different time intervals, arranged in series, i.e., T=T+1 hour, at T=T+2 hours, and at T=T+3 hours, respectively. In this manner, a probabilistic forecast of precipitation may be obtained for up to T=T+10 hours.

Regardless for how far into the future precipitation or any event, for that matter, is forecasted, for each of these probabilistic distribution forecasts and similar to that shown in FIG. 4, the Y-axis is used for representing a probability function values of precipitation amounts greater than X (i.e., amount of precipitation) and the X-axis is used for representing the varying amounts of precipitation represented by the variable "X." FIG. 7A shows that for the T=0, prior to a storm's arrival, "Precip=0" means that there is no precipitation or rainfall at that time. Similarly, FIGS. 7B-7D show that for their different time intervals (in series) different precipitation values, i.e., "Precip=a," "Precip=b," and "Precip=c." According to FIGS. 7A-7D, the forecasted amount of precipitation for a particular time interval is obtained by calculating the area under the probabilistic distribution forecast curve associated with that time interval. In other words, integrating a function representing a probabilistic distribution forecast of precipitation over a particular time interval provides the forecasted amount of precipitation for that time interval. Having knowledge of the forecasted amount of precipitation for different time intervals is insightful of the size of a potential storm and allows to prepare for it by enabling low-quality treatment well in advance to avoid undesirable overflow in the sewer system.

Figure 8:
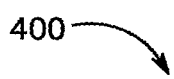
FIG. 8 shows a table, according to one embodiment of the present teachings, displaying column-wise different ensemble forecasts, for different time intervals, created using the probabilistic forecast shown in FIG. 7.

Next, sewer management method 200 may proceed to a step 204 that includes building for the variable (e.g., X=amount of precipitation), based upon the probabilistic distribution forecast, multiple time interval ensemble forecasts, each for one of the time intervals. To this end, FIG. 8 shows a table 400, in which different "Ensemble Forecasts" are presented row-wise for each of the different time intervals, e.g., T=0 hours, T=T+1 hour, T=T+2 hours and T=T+3 hours. "Ensemble forecasts for the different time intervals" may be thought as—"different scenarios of amounts of precipitation realized for different time intervals." For each time interval, ensemble entries are arranged such that the average forecasted precipitation values (e.g., 0, a, b, and c shown at the last row of table 400) equal to those obtained in step 202 (e.g., "Precip=0," "Precip=a," "Precip=b," and "Precip=c" shown in FIGS. 7A-7D.)

At the conclusion of step 204, step 206 is performed. This step includes retrieving or developing a flow simulation to simulate flow through a sewer system. "Flow simulation" may be thought as a sewage or fluid flow model that describes "flow through a sewer system."

Sewer management method 200 then proceeds to step 208, which includes initializing the flow simulation (of step 206), by accounting for one or more flow attributes present at the sewer system, to generate an initialized flow simulation. By way of example, sewage or fluid stored in storage chamber 114 is accounted for in this step before the flow simulation is run for different possible outcomes. In another example, the flow rate of fluid flowing inside the sewer system (e.g., sewer system 100 of FIG. 5) is accounted for as well.

Once the initialized flow simulation is generated in step 208, sewer management method 200 is prepared to run the simulation. Accordingly, next step 210 includes running, based on assumed values present at a treatment scheme (e.g., treatment scheme 125 of FIG. 5) located outside the sewer system, the initialized flow simulation (of step 208) that uses each of the time interval ensemble forecasts (of step 204) to determine the number of times one or more different outcomes (e.g., "No Overflow" and "Overflow" of FIG. 3) are realized.

Then, a step 212 includes establishing, based on the number of times one or more outcomes are realized (in step 210) a cost of realizing an outcome for the sewer system. By way of example, step 212 is carried out by establishing:

$$C_{storage} = Y/(X+Y) \quad \text{(Equation 1)}$$

In Equation 1, "Y" equals number of times one of the potential outcomes (in step 210) is realized and "X" equals number of times another of the potential outcomes (also in step 210) is realized. In this example, one of the potential outcomes (e.g., "No Overflow" of FIG. 3) is different from another of the potential outcomes (e.g., "Overflow" of FIG. 3). In the example of FIG. 5, sewer system 100 includes one or more storage chambers (e.g., storage chamber 114) for storing a fluid, and in example of Equation 1, "Y" equals number of times one or more of the storage chambers overflows and "X" equals number of times one or more of the storage chambers does not overflow.

Sewer management method 200 also calculates another competing cost function. Specifically, step 214 includes establishing, based on the number of said flow attributes in the sewer system, a cost of flow through the sewer system. By way of example, step 214 is carried out by establishing:

$$Cst = \frac{Qst(t)}{Q\max}(1-\varepsilon) = \varepsilon \quad \text{(Equation 2)}$$

In Equation 2, "Cst" is the cost of flow inside the sewer system, "Qst(t)" represents a current flow condition attribute value associated with the treatment scheme located outside the sewer system, "Qmax" represents a maximum flow condition attribute value associated with the treatment scheme and "ε" is a minimum cost value associated with the treatment scheme.

Finally, sewer management method 200 preferably concludes at step 216, which includes controlling, using a flow controller (e.g., a flow controller 128 of FIG. 5), fluid or sewage flow through the sewer system to minimize a difference between the cost of realizing an outcome for the sewer system (i.e., established in step 212) and the cost of flow through the sewer system (i.e., established in step 214). By way of example, in step 216, a flow controller is a proportional, integral, derivative controller. Further, the controller may control the operation of a flow-modifying device that increases or decreases a flow rate of the fluid flowing through the flow-modifying device or through the sewer system. Further still, the controller may modify, using a pump that receives instructions from the controller, a pumping rate of the fluid or sewage exiting from said sewer system to the treatment scheme located outside said sewer system. In one embodiment, step 216 of the present teaching includes increasing, prior to arrival of a storm, the pumping rate of the fluid or sewage exiting the sewer system to the treatment scheme.

Although illustrative embodiments of the present teachings and arrangements are shown and described in terms of controlling fluid within a sewer system, other modifications, changes, and substitutions are intended. By way of example, certain embodiments discuss processing fluid streams found in sewage systems, but the present teachings and arrangements are not so limited, and extend to any water collection and conveyance systems. Accordingly, it is appropriate that the disclosure be construed broadly and in a manner consistent with the scope of the disclosure, as set forth in the following claims.

What is claimed is:

1. A sewer system, comprising:
   one or more storage chambers;
   two or more flow condition attribute measuring devices, at least one of which is arranged to measure a flow condition attribute value of fluid stored inside one of said storage chambers and at least another of which is arranged to measure a flow condition attribute value of fluid flowing inside said sewer system;
   one or more flow controllers that are communicatively coupled to receive said flow condition attribute values from two or more of said flow condition attribute measuring devices, and wherein one of said flow controllers, based upon said flow condition attribute value of fluid stored inside one of said storage chambers, establishes a cost function of realizing one or more potential outcomes of said sewer system, and wherein based upon said flow condition attribute value of flow inside said sewer system, one and/or another of said flow controllers establishes a cost function of flow inside said sewer system; and
   one or more flow-modifying devices, each of which is coupled to at least one flow controllers and based upon instruction from at least one of said flow controllers, said flow-modifying device is capable of modifying flow of fluid through one or more of said flow-modifying devices to minimize a difference between said cost function of realizing one or more potential outcomes of said sewer system and said cost function of flow inside said sewer system.

2. The sewer system of claim 1, wherein one or more of said flow controllers are programmed to provide instructions for modifying flow rate of fluid exiting from said sewer system to enter a low-quality treatment scheme that is not part of said sewer system.

3. The sewer system of claim 2, wherein said low-quality treatment scheme is configured to provide partial treatment of fluid exiting from said sewer system.

4. The sewer system of claim 1, wherein one or more of said flow controllers are programmed to provide instructions for modifying flow rate of fluid exiting from said sewer system to enter a high-quality treatment scheme that is not part of said sewer system, and wherein said high-quality treatment includes chemical, mechanical, and contaminant treatment.

5. The sewer system of claim 1, wherein said sewer system includes a storage chamber and a treatment chamber.

6. The sewer system of claim 1, wherein said flow condition attribute measuring device used for measuring said flow condition attribute value of fluid stored inside one of said storage chambers is of the same type as said flow condition attribute measuring device used for measuring said flow condition attribute of fluid flowing inside said sewer system.

7. The sewer system of claim 1, wherein said flow condition attribute measuring device used for measuring said flow condition attribute value of fluid stored inside one of said storage chambers is of a different type than said flow condition attribute measuring device used for measuring said flow condition attribute value of fluid flowing inside said sewer system.

8. The sewer system of claim 7, wherein one of said flow condition attribute measuring devices is a level meter that is configured to measure a height or a level value of fluid stored inside one of said storage chambers.

9. The sewer system of claim 7, wherein one of said flow condition attribute measuring devices is a flow rate meter that is configured to measure a flow rate of fluid flowing inside said sewer system.

10. The sewer system of claim 1, wherein one or more said fluid flow controllers is a proportional-integral-derivative controller that modifies a fluid pump rate of a pump that pumps fluid out of said sewer system and into a treatment scheme that is not part of said sewer system.

11. The sewer system of claim 1, wherein at least one of said flow condition attribute values is at least one value of a flow condition attribute chosen from a group comprising fluid flow rate, fluid height, fluid volume, hydraulic capacity, time of fluid retention, storage capacity, and fluid quality.

12. The sewer system of claim 1, wherein one or more of said flow-modifying devices include at least one member chosen from a group comprising fluid facility, fluid pump station, gate, inflatable dam, weir, pump and valve.

13. The sewer system of claim 1, wherein one or more of said controllers modify flow exiting from said sewer system to be introduced into one or more treat facilities, at least one of which is chosen from a group comprising storage tank, trunk line, fluid treatment plant, treatment chamber, holding pool, reservoir, ocean, and river.

14. The sewer system of claim 1, wherein one or more flow controllers are coupled to and operate in conjunction with a neural network.

15. A method for managing a sewer system, said method comprising:
   obtaining a probabilistic distribution forecast for a variable for each of multiple time intervals;
   building for said variable, based upon said probabilistic distribution forecast, multiple time interval ensemble forecasts, each ensemble forecast for one of said multiple time intervals;
   retrieving or developing a flow simulation to simulate flow of a fluid inside said sewer system;
   initializing said flow simulation, by accounting for one or more flow condition attributes present inside said sewer system, to generate an initialized flow simulation;
   running, based on an assumed value of one or more flow condition attributes present at a treatment scheme located outside said sewer system, said initialized flow simulation that uses each of said time interval ensemble forecasts to arrive at number of times one or more different potential outcomes are realized;
   establishing, based on number of times one or more of said potential outcomes are realized, a cost function of realizing one or more potential outcomes of said sewer system;
   establishing, based on one or more of said flow condition attributes in said sewer system, a cost function of flow inside said sewer system; and
   controlling, using a flow controller, flow of said fluid exiting said sewer system to minimize a difference between said cost function of realizing one or more potential outcomes of said sewer system and said cost function of flow inside said sewer system.

16. The method for managing said sewer system of claim 15, wherein said obtaining includes obtaining from a weather service a rainfall probabilistic distribution forecast for a plurality of hours in the future.

17. The method for managing said sewer system of claim 16, wherein said building includes building a rainfall time interval ensemble forecast for multiple of said time intervals in series such that an average or median value of precipitation obtained from each of said time intervals substantially equals a value of said precipitation in corresponding ones of said time intervals of said rainfall probabilistic distribution forecast.

18. The method for managing said sewer system of claim 15, wherein said initializing includes using one or more primary flow condition attribute measuring devices, which measure one or more flow condition attributes inside said sewer system.

19. The method for managing said sewer system of claim 18, wherein said initializing includes using one or more measurements from a level meter, which measures a fluid level in a storage chamber inside said sewer systems, and one or more measurements from a flow rate meter, which measures a flow rate of a fluid exiting said sewer system and flowing into said treatment scheme.

20. The method for managing said sewer system of claim 15, wherein said running, based on a current value of one or more flow condition attributes present at said treatment scheme located outside said sewer system.

21. The method for managing said sewer system of claim 20, wherein said running includes using one or more measurements from a flow rate meter, which measures flow rate of a fluid exiting said sewer system and flowing into said treatment scheme located outside said sewer system.

22. The method for managing said sewer system of claim 20, wherein said treatment scheme includes a low-quality treatment scheme.

23. The method for managing said sewer system of claim 15, wherein said establishing said cost function of realizing one or more potential outcomes of said sewer system includes establishing $C_{storage}=Y/(X+Y)$; wherein said Y equals number of times one of said potential outcomes is realized and said X equals number of times another of said potential outcomes is realized, wherein one of said potential outcomes is different from another of said potential outcomes.

24. The method for managing said sewer system of claim 23, wherein said sewer system includes one or more storage chambers for storing a fluid, and wherein in said establishing said cost function of realizing one or more potential outcomes of said sewer system, said Y equals number of times one or more of said storage chambers overflows and said X equals number of times one or more of said storage chambers does not overflow.

25. The method for managing said sewer system of claim 15, wherein in said establishing said cost function of flow inside said sewer system includes establishing $Cst=Qst(t)/Qmax(1-\varepsilon)=\varepsilon$; wherein said Cst is said cost of flow inside said sewer system, said $Qst(t)$ is a current flow condition attribute value associated with said treatment scheme located outside said sewer system, said Qmax is a maximum flow condition attribute value associated with said treatment scheme and said $\varepsilon$ is a minimum cost associated with said treatment scheme.

26. The method for managing said sewer system of claim 25, wherein said treatment scheme includes a low-quality treatment chamber for treating a fluid conveyed from said sewer system, and wherein in said establishing said cost function of flow inside said sewer system, $Qst(t)$ is a current flow rate through said high-rate treatment chamber, Qmax is a maximum flow rate through said high-rate treatment chamber and $\varepsilon$ is the minimum cost associated with said high-rate treatment chamber.

27. The method for managing said sewer system of claim 15, wherein said controlling includes using a proportional, integral, derivative controller.

28. The method for managing said sewer system of claim 15, wherein in said controlling, said controller controls operation of said flow-modifying device such that said flow-modifying device increases or decreases a flow rate of said fluid exiting said sewer system and flowing into said treatment scheme.

29. The method for managing said sewer system of claim 15, wherein said controlling includes modifying, using a pump that receives instructions from said controller, a pumping rate of said fluid exiting said pump from said sewer system to said treatment scheme located outside said sewer system, and wherein said fluid includes sewage.

30. The method for managing said sewer system of claim 29, wherein said controlling includes increasing, prior to arrival of a storm, flow rate of said fluid exiting said sewer system and flowing into said treatment scheme.

* * * * *